United States Patent
Utsunomiya

(10) Patent No.: US 8,334,844 B2
(45) Date of Patent: Dec. 18, 2012

(54) LOW POWER CONSUMPTION ELECTRONIC MOUSE DEVICE

(75) Inventor: Fumiyasu Utsunomiya, Chiba (JP)

(73) Assignee: Seiko Instruments Inc., Chiba (JP)

( * ) Notice: Subject to any disclaimer, the term of this patent is extended or adjusted under 35 U.S.C. 154(b) by 250 days.

(21) Appl. No.: 12/728,408

(22) Filed: Mar. 22, 2010

(65) Prior Publication Data

US 2011/0193781 A1    Aug. 11, 2011

(30) Foreign Application Priority Data

Feb. 10, 2010   (JP) .................................. 2010-028097

(51) Int. Cl.
  G09G 5/00   (2006.01)
  G09G 5/08   (2006.01)
  G06F 3/02   (2006.01)
(52) U.S. Cl. .................... 345/166; 345/156; 345/163
(58) Field of Classification Search .......... 345/156–157; 356/213; 250/200, 214 R–214 SW; 348/294
See application file for complete search history.

(56) References Cited

U.S. PATENT DOCUMENTS

| | | | |
|---|---|---|---|
| 7,199,783 B2* | 4/2007 | Wenstrand et al. | 345/156 |
| 2004/0155860 A1* | 8/2004 | Wenstrand et al. | 345/156 |
| 2006/0132447 A1* | 6/2006 | Conrad | 345/168 |
| 2011/0012926 A1* | 1/2011 | Kerr et al. | 345/649 |

FOREIGN PATENT DOCUMENTS

| | | |
|---|---|---|
| JP | 10-124250 A | 5/1998 |
| JP | 11-224158 A | 8/1999 |

* cited by examiner

*Primary Examiner* — Bipin Shalwala
*Assistant Examiner* — Ryan A Lubit
(74) *Attorney, Agent, or Firm* — Brinks Hofer Gilson & Lione

(57) ABSTRACT

Provided is a convenient mouse device having low power consumption. The mouse device has a configuration in which an optical sensor for light shielding detection is provided in a region where a hand blocks light when the hand handles the mouse device so that the mouse device may perform a normal operation when the optical sensor for light shielding detection is shielded from light, and may perform a low consumption operation when the optical sensor for light shielding detection is not shielded from light.

13 Claims, 3 Drawing Sheets

LOW POWER CONSUMPTION ELECTRONIC MOUSE DEVICE

RELATED APPLICATIONS

This application claims priority under 35 U.S.C. §119 to Japanese Patent Application No. 2010-028097 filed on Feb. 10, 2010, the entire content of which is hereby incorporated by reference.

BACKGROUND OF THE INVENTION

1. Technical Field

The present invention relates to a personal computer mouse device, and more particularly, to a very convenient mouse device having low power consumption compared with conventional one.

2. Background Art

Due to a recent demand for lower power consumption in electronic devices, there is an increasing demand for lower power consumption in personal computer mouse devices as well. In particular, wireless mouse devices are facing a more increasing demand for lower power consumption in order to reduce the burden of internal-battery replacement.

FIG. 5 illustrates a conventional mouse device. Connection is made as follows. A power source 206 is connected to a touch sensor 501 and control means 205. An output of the touch sensor 501 is connected to the control means 205. An output of the control means 205 is connected to movement amount detection means 201, conversion means 202, and transmission means 203. An output of the movement amount detection means 201 is connected to the conversion means 202. An output of the conversion means 202 is connected to the transmission means 203.

The movement amount detection means 201 detects a movement amount of the mouse device. The conversion means 202 converts the movement amount from the movement amount detection means 201 into an electrical signal. The transmission means 203 transmits the electrical signal converted by the conversion means 202 to a personal computer. The touch sensor 501 monitors whether or not the mouse device is touched with a hand, and outputs a result as a detection signal. Using the detection signal from the touch sensor 501, the control means 205 controls how the mouse device operates. The power source 206 supplies power necessary to allow the mouse device to operate.

With the above-mentioned configuration, when the mouse device is touched with a hand, the touch sensor 501 outputs a detection signal notifying that the hand touch is present. In response to the detection signal, the control means 205 controls the mouse device to perform a normal operation. On the other hand, when the mouse device is not touched with a hand, the touch sensor 501 outputs a detection signal notifying that the hand touch is not present. In response to the detection signal, the control means 205 recognizes the mouse device as being not touched with a hand, and then controls the mouse device to operate in a standby mode, where power consumption is small. Alternatively, the control means 205 controls to stop the power supply to the respective means inside the mouse device.

As described above, the conventional mouse device performs the normal operation only when the mouse device is touched with a hand. On the other hand, when the mouse device is not touched with a hand, the mouse device suspends its operation or operates in a low power consumption mode, such as a standby mode, or alternatively the power supply to the respective means inside the mouse device is stopped, to thereby realize lower power consumption (see, for example, Patent Document 1).

There is another configuration in which a vibration sensor or an acceleration sensor is provided instead of the touch sensor 501 illustrated in FIG. 5. The vibration sensor or the acceleration sensor detects a movement of the mouse device, and if the movement is not detected for a predetermined time period, the mouse device suspends its operation or operates in the low power consumption mode, such as the standby mode, or alternatively the power supply to the respective means inside the mouse device is stopped, to thereby realize lower power consumption (see, for example, Patent Document 2).

Patent Document 1 JP 10-124250 (FIG. 1)
Patent Document 2 JP 11-224158 (FIG. 1)

SUMMARY OF THE INVENTION

The conventional mouse device uses the touch sensor. When the mouse device is not touched with a hand, the mouse device suspends its operation or operates in the low power consumption mode, such as the standby mode, or alternatively the power supply to the respective means inside the mouse device is stopped, to thereby realize lower power consumption (hereinafter, referred to as low power consumption operation). Recent mouse devices are small-sized. Therefore, in moving or handling the mouse device with a hand placed on the mouse device, the hand often touches only a part of the mouse device. In this case, the touch sensor cannot detect the mouse device as being touched with the hand, with the result that the low power consumption operation continues. Accordingly, there is a problem that it is inconvenient because the mouse device does not operate unless the mouse device is handled through the exact hand touch. In addition, there is another problem of increased power consumption because the touch sensor consumes power. Further, in a case of a wireless mouse device, if put into a bag or the like, the wireless mouse device may malfunction because being incapable of discriminating between the case where the touch sensor is touched with a hand and the case where the touch sensor is touched with an inner portion of the bag or the like. Therefore, power consumption increases because of the malfunction, and accordingly a period before battery replacement is shortened, resulting in another problem that the burden of the battery replacement is increased.

In the case where the vibration sensor or the acceleration sensor is used, the shift to the normal operation is performed in response to the movement of the mouse device, and the shift to the low power consumption operation is performed in response to the stop of the movement of the mouse device. Once the mouse device performs the normal operation, the shift to the low power consumption operation is enabled in response to the stop of the movement of the mouse device. Therefore, there is a problem that it is inconvenient because the shift to the low power consumption operation cannot be performed unless the mouse device is stopped moving after the mouse device is moved once. Further, the configuration is made in which a timer circuit is built into the mouse device so that the shift to the low power consumption operation may be performed after a given time period has elapsed until a vibration with a predetermined level is not applied to the mouse device. Therefore, the immediate shift to the low power consumption operation cannot be performed unless the mouse device is moved once, resulting in another problem of wasted power consumption. In addition, there is another problem of increased power consumption because the vibration sensor or the acceleration sensor consumes power. Further, in the case of the wireless mouse device, if put into a bag or the like, the wireless mouse device may malfunction because being frequently applied with a vibration or an acceleration. Therefore, power consumption increases because of the malfunction, and accordingly a period before battery replacement is shortened, resulting in another problem that the burden of the battery replacement is increased.

The present invention has been made in view of the above-mentioned problems, and provides a convenient mouse device having low power consumption compared with the conventional mouse device. Further, when applied to a wireless mouse device, the present invention provides a wireless mouse device in which a malfunction occurring when put into a bag or the like is prevented to prevent an increase in power consumption so that the burden of battery replacement may be reduced.

In order to solve the above-mentioned problems inherent in the conventional mouse devices, a mouse device according to the present invention is provided with operation modes including: a normal operation of converting a movement amount into an electrical signal and outputting the electrical signal; and a low consumption operation in which power consumption is smaller than power consumption in the normal operation, the mouse device including an optical sensor for light-shielding detection which is provided in a region where a handling hand blocks light when the hand handles the mouse device so that the mouse device performs the normal operation when the optical sensor for light shielding detection is shielded from light, and performs the low consumption operation when the optical sensor for light shielding detection is not shielded from light.

The mouse device according to the present invention uses the light detection means having low power consumption, to thereby realize convenience and low power consumption compared with the conventional mouse devices.

DETAILED DESCRIPTION OF THE PREFERRED EMBODIMENTS

Hereinafter, embodiments of the present invention are described with reference to the drawings.

<First Embodiment>

Figure 1:
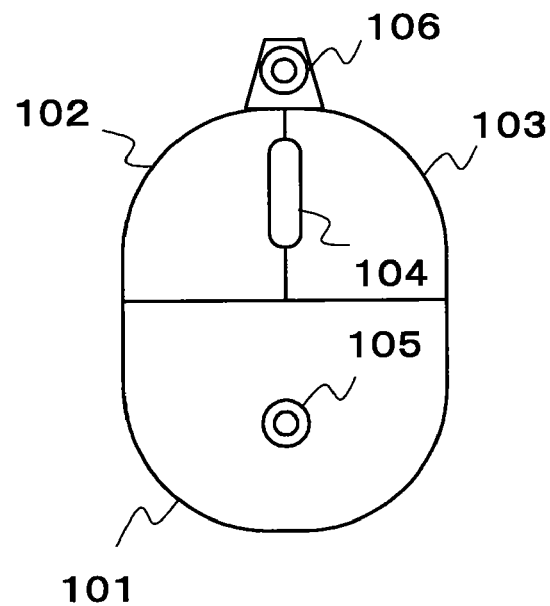
FIG. 1(A) is a schematic structural view illustrating a mouse device, viewed from the top surface, according to a first embodiment of the present invention.
FIG. 1(B) is a schematic structural view illustrating a mouse device, viewed from the rear surface, according to the first embodiment of the present invention.
Figure 1:
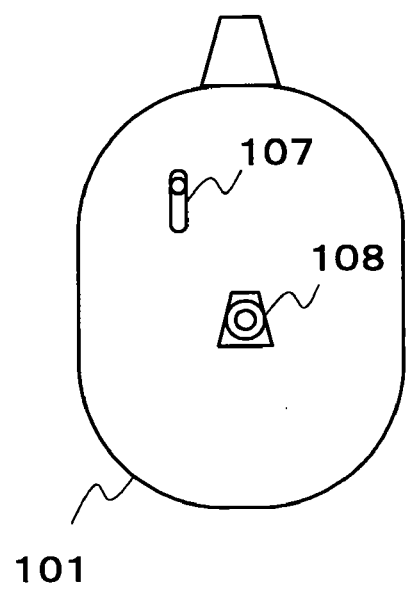

FIG. 1 are schematic structural views illustrating a mouse device according to a first embodiment of the present invention. FIG. 1(A) is a structural view of the mouse device viewed from the top surface, and FIG. 1(B) is a structural view thereof viewed from the rear surface.

As illustrated in FIG. 1(A), a mouse device 101 includes a first button 102, a second button 103, a wheel 104, a first optical sensor 105, and a second optical sensor 106.

The first optical sensor 105 is installed in a region where a hand covers when handling the mouse device 101, and detects the mouse device as being touched with the hand. The second optical sensor 106 is installed in a region where the hand does not cover when handling the mouse device, and detects ambient brightness.

When the ambient brightness is high and the mouse device 101 is touched with the hand, an amount of light entering the first optical sensor 105 reduces while an amount of light entering the second optical sensor 106 increases. In this case, the mouse device 101 performs a normal operation.

When the ambient brightness is high and the mouse device 101 is not touched with the hand, the amount of light entering the first optical sensor 105 increases and the amount of light entering the second optical sensor 106 increases as well. In this case, the mouse device suspends its operation or operates in a low power consumption mode, such as a standby mode, or alternatively power supply to respective means inside the mouse device is stopped, to thereby realize lower power consumption (hereinafter, referred to as low power consumption operation).

When the ambient brightness is low, the amount of light entering the second optical sensor 106 reduces. In this case, the low power consumption operation is performed even when the mouse device 101 is touched with the hand. The first optical sensor 105 cannot discriminate between the case where the ambient brightness is low and the case where the mouse device is touched with the hand. For that reason, the discrimination is made possible by means of the second optical sensor 106 detecting the ambient brightness.

Accordingly, when ambient brightness is high, the mouse device 101 performs the normal operation only when the hand handles the mouse device 101. Then, when the hand is released from the mouse device 101, the mouse device 101 performs the low power consumption operation. When ambient brightness is low, the mouse device 101 performs the low power consumption operation.

As illustrated in FIG. 1(B), the rear surface of the mouse device 101 is constituted by a switch 107 and movement amount detection means 108. The switch 107 has a function of allowing the mouse device to perform the normal operation all the time by being turned ON. Therefore, even when the ambient brightness is low, the normal operation may be performed all the time as long as the switch 107 is turned ON.

Figure 2:
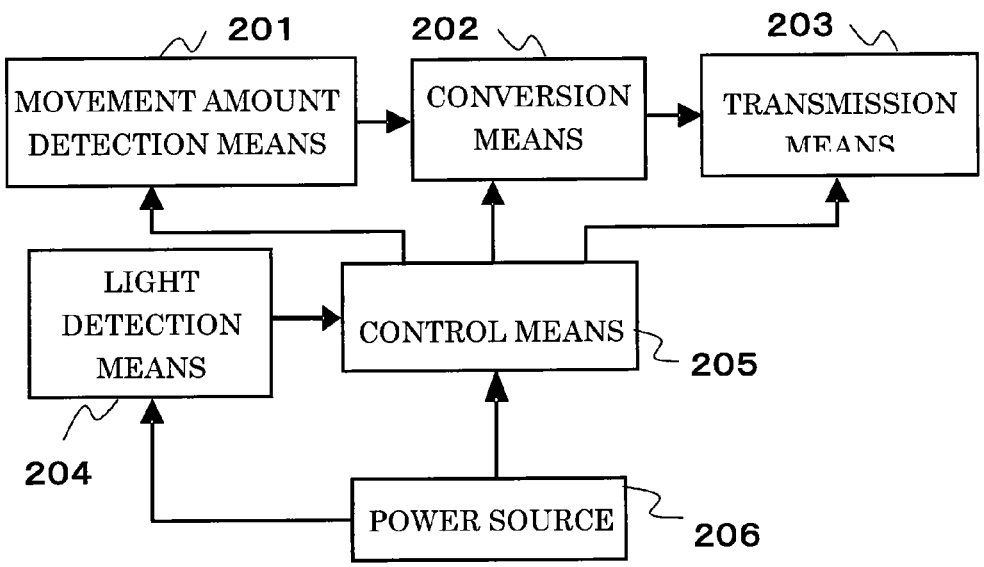
FIG. 2 is a schematic circuit block diagram illustrating a circuit configuration of the mouse device according to the present invention.

FIG. 2 is a schematic circuit block diagram illustrating a circuit configuration of the mouse device according to the present invention. The mouse device includes movement amount detection means 201, conversion means 202, transmission means 203, light detection means 204, control means 205, and a power source 206.

Connection is made as follows. The power source 206 is connected to the light detection means 204 and the control means 205. An output of the light detection means 204 is connected to the control means 205. An output of the control means 205 is connected to the movement amount detection means 201, the conversion means 202, and the transmission means 203. An output of the movement amount detection means 201 is connected to the conversion means 202. An output of the conversion means 202 is connected to the transmission means 203.

Next, an operation is described.

The power source 206 supplies drive power to the respective means. The movement amount detection means 201 detects a movement amount of the mouse device. The conversion means 202 converts the movement amount of the mouse device detected by the movement amount detection means 201 into an electrical signal. The transmission means 203 outputs the electrical signal corresponding to the movement amount of the mouse device converted by the conversion means 202, to a personal computer, for example. The light detection means 204 includes the first optical sensor 105 and the second optical sensor 106, which are illustrated in FIG. 1, and outputs respective detection results of those optical sensors. Based on the output from the light detection means 204, the control means 205 switches respective operations of the movement amount detection means 201, the conversion means 202, and the transmission means 203.

In this way, the mouse device according to the present invention is capable of outputting the detection results of the first optical sensor 105 and the second optical sensor 106 to the control means 205 to thereby switch an operation mode.

As described above, the mouse device according to the present invention has the configuration in which the optical sensor is disposed in the region where a hand covers when handling the mouse device so that the mouse device may perform the normal operation when the light entering the optical sensor is blocked by the hand. Accordingly, if the setting is made such that the optical sensor determines the low ambient brightness in a case where a certain amount of the light entering the optical sensor is blocked, the mouse device is allowed to operate even when the mouse device is not touched with a hand exactly. The mouse device according to the present invention may solve such a problem, inherent in a conventional mouse device using a touch sensor, that the mouse device cannot perform the normal operation unless the mouse device is touched with a hand exactly.

Further, as described above, the mouse device according to the present invention performs the normal operation at a moment before the mouse device is handled with a hand, and at a moment when the hand is released from the mouse device, the mouse device suspends its operation or operates in the low power consumption mode, such as the standby mode, or alternatively the power supply to the respective means inside the mouse device 101 is stopped. Therefore, the mouse device according to the present invention may solve such a problem, inherent in a conventional mouse device using a vibration sensor or an acceleration sensor, that the mouse device cannot perform the normal operation unless a vibration or an acceleration is generated by a waste operation, such as moving the mouse device. Besides, the mouse device according to the present invention may solve such a problem, inherent in the conventional mouse device using the vibration sensor or the acceleration sensor, that it takes a time for the mouse device to suspend its operation or operate in the low power consumption mode, such as the standby mode, or alternatively to stop the power supply to the respective means inside the mouse device 101, with the result that current consumption is increased correspondingly to the added time period.

Further, the mouse device according to the present invention has the configuration in which the optical sensor for detecting ambient brightness is provided so that, if the optical sensor determines the low ambient brightness, the mouse device may suspend its operation or operate in the low power consumption mode, such as the standby mode, or alternatively the power supply to the respective means inside the mouse device 101 may be stopped. Therefore, in a case where the mouse device according to the present invention is applied to a wireless mouse device, in carrying the wireless mouse device in a bag or the like, there is absolutely no case for the wireless mouse device to malfunction as long as inside the bag is dark. In other words, when applied to the wireless mouse device, the mouse device according to the present invention may solve such a problem, inherent in the conventional mouse device using the vibration sensor or the acceleration sensor, that the burden of battery replacement is increased because power consumption is increased due to a malfunction time period during the carrying in a bag or the like.

Figure 3:
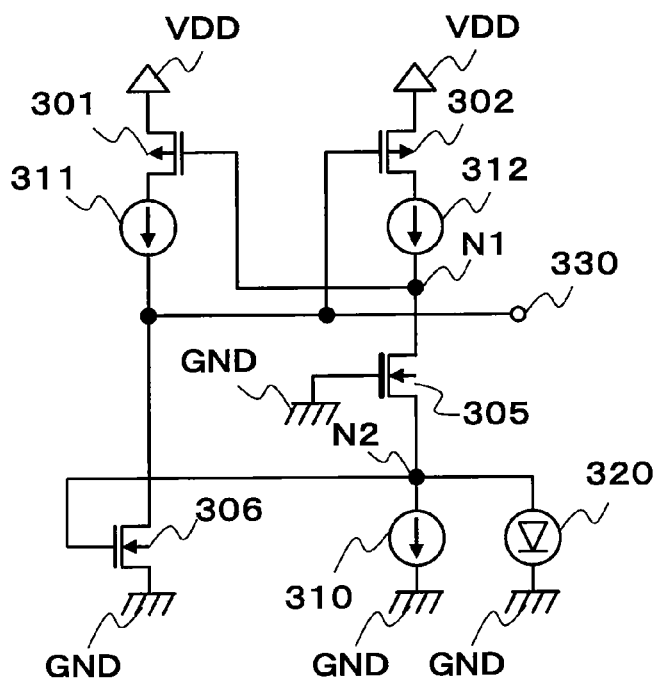
FIG. 3 is a schematic circuit diagram of light detection means included in the mouse device according to the present invention.

FIG. 3 is a schematic circuit diagram of the light detection means 204 included in the mouse device 101 according to the present invention. As illustrated in FIG. 3, a P-channel MOS transistor 301 has a source connected to a positive power supply terminal VDD, a gate connected to a node N1, and a drain connected to a current inflow terminal of a constant current circuit 311. An N-channel MOS transistor 306 has a source connected to a reference power supply terminal GND, a gate connected to a node N2, and a drain connected to an output terminal 330. A P-channel MOS transistor 302 has a source connected to the positive power supply terminal VDD, a gate connected to the output terminal 330, and a drain connected to a current inflow terminal of a constant current circuit 312. A depletion type N-channel MOS transistor 105 has a source connected to the node N2, a gate connected to the reference power supply terminal GND, and a drain connected to the node N1. A constant current circuit 310 has a current inflow terminal connected to the node N2, and a current outflow terminal connected to the reference power supply terminal GND. The constant current circuit 311 has a current outflow terminal connected to the output terminal 330. The constant current circuit 312 has a current outflow terminal connected to the node N1. An optical sensor 320 has a positive terminal connected to the node N2, and a negative terminal connected to the reference power supply terminal GND. Although not illustrated, the positive power supply terminal VDD is supplied with a positive voltage from a power source, while the reference power supply terminal GND is supplied with a zero-volt voltage from the power source. Note that, the constant current circuit 310 and the constant current circuit 312 are set so that the constant current circuit 310 has a larger constant current value.

Next, an operation is described. When ambient brightness is high and an amount of light entering the optical sensor 320 is equal to or more than a light amount to be detected, a voltage of the node N2 increases due to generated power of the optical sensor 320. Then, the depletion type N-channel MOS transistor 305 is turned OFF, and the N-channel MOS transistor 306 is turned ON. A voltage of the output terminal 330 is discharged to around the voltage of the reference power supply terminal GND with an ON-state current of the N-channel MOS transistor 306. Then, the P-channel MOS transistor 302 is turned ON to increase a voltage of the node N1 to around the voltage of the positive power supply terminal VDD. Because the voltage of the node N1 increases to around the voltage of the positive power supply terminal VDD, the P-channel MOS transistor 301 approaches an OFF state. In this way, when the ambient brightness is high, Low is output to the output terminal 330. Further, the MOS transistors interrupt paths in which a current flows, and hence little consumption current is consumed.

When the ambient brightness is low and the amount of light entering the optical sensor 320 is less than the light amount to be detected, the generated power of the optical sensor 320 is so small that the voltage of the node N2 may decrease due to constant current discharge made by the constant current circuit 210. Then, the N-channel MOS transistor 306 is turned OFF, and the depletion type N-channel MOS transistor 305 is turned ON. The voltage of the node N1 is discharged to around the voltage of the reference power supply terminal GND with an ON-state current of the depletion type N-channel MOS transistor 305. Then, the P-channel MOS transistor 301 is turned ON to increase the voltage of the output terminal 330 to around the voltage of the positive power supply terminal VDD. Because the voltage of the output terminal 330 increases to around the voltage of the positive power supply terminal VDD, the P-channel MOS transistor 302 approaches an OFF state. In this way, when the ambient brightness is low, High is output to the output terminal 330. Further, the MOS transistors interrupt the paths in which a current flows, and hence little consumption current is consumed.

In this way, the light detection means 204 included in the mouse device 101 according to the present invention outputs Low to the output terminal 330 when ambient brightness is high, and outputs High to the output terminal 330 when ambient brightness is low. Further, regardless of ambient brightness, a path in which a current flows is interrupted all the time, and hence little consumption current is consumed. Therefore, power consumption may be reduced much more compared with the conventional mouse devices.

As described above, unlike the conventional mouse device using the touch panel, the vibration sensor, or the acceleration sensor, which consumes consumption power for the mere detection of each sensor, the mouse device using the light detection means according to the present invention has little power consumption for sensing light. Therefore, the mouse device using the light detection means according to the present invention has power consumption reduced correspondingly to the eliminated power consumption. In particular, in the state where the mouse device suspends its operation or where the power supply to the respective means inside the mouse device is stopped, the light detection means according to the present invention consumes little power, with the result that the mouse device using the light detection means according to the present invention consumes little current. Consequently, in a case where the mouse device is not in use for a long time, power consumption is reduced much more compared with the conventional mouse device. Besides, unlike the conventional wireless mouse device, which needs frequent battery replacement, a wireless mouse using the light detection means according to the present invention has a very long time period before battery replacement.

Note that, although not illustrated, it is possible to use general light detection means to realize the functions and features, except for current consumption, of the mouse device according to the present invention, to thereby reduce power consumption compared with the conventional mouse devices. Further, the same effect can also be obtained by reversing polarities of all the transistors of FIG. 3.

Further, although not illustrated, what input to the node N2 of FIG. 3 may be a result determined by amplifying the generated power of the first optical sensor 105 of FIG. 1 one or more times and subtracting the resultant generated power from the generated power of the second optical sensor 106.

Still further, although not illustrated, the configuration may be realized by using only the first optical sensor 105 so that the mouse device may perform the low power consumption operation with only the detection of the mouse device as being touched with a hand. Alternatively, the configuration may be realized by using only the second optical sensor 106 so that the mouse device may perform the low power consumption operation with only the detection of ambient brightness.

<Second Embodiment>

Figure 4:
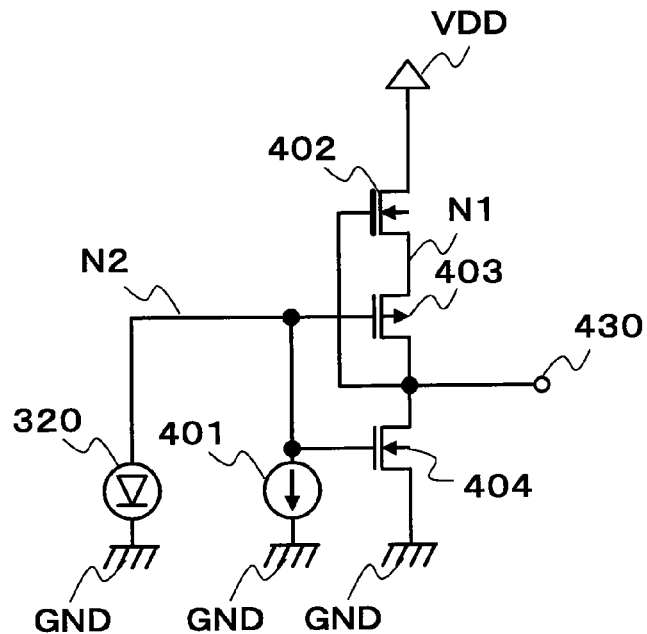
FIG. 4 is a schematic circuit diagram of light detection means included in the mouse device according to a second embodiment of the present invention.
Figure 5:
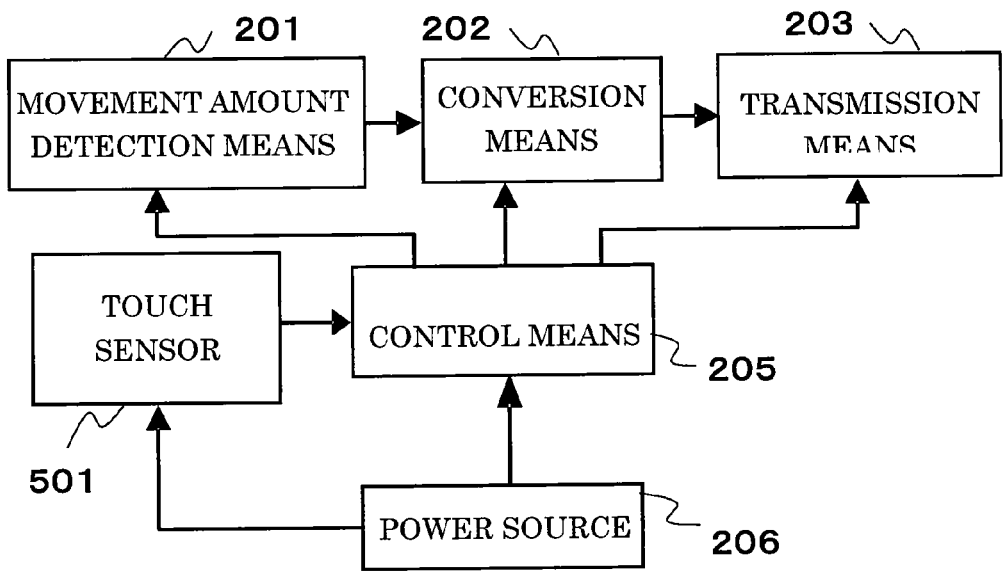
FIG. 5 is a schematic circuit block diagram illustrating a circuit configuration of a conventional mouse device.

FIG. 4 is a schematic circuit diagram of light detection means 204 according to a second embodiment of the present invention, which is included in the mouse device 101. The light detection means according to the second embodiment illustrated in FIG. 4 is used as the light detection means 204 illustrated in FIG. 2. As illustrated in FIG. 4, a depletion type N-channel MOS transistor 402 has a source connected to a node N1, a gate connected to an output terminal 430, and a drain connected to a positive power supply terminal VDD. A P-channel MOS transistor 403 has a source connected to the node N1, a gate connected to a node N2, and a drain connected to the output terminal 430. An N-channel MOS transistor 404 has a source connected to a reference power supply terminal GND, a gate connected to the node N2, and a drain connected to the output terminal 430. An optical sensor 320 has a positive terminal connected to the node N2, and a negative terminal connected to the reference power supply terminal GND. A constant current circuit 401 has a current inflow terminal connected to the node N2, and a current outflow terminal connected to the reference power supply terminal GND. Although not illustrated, the positive power supply terminal VDD is supplied from a positive voltage from a power source, while the reference power supply terminal GND is supplied with a zero-volt voltage from the power source.

Next, an operation is described. When ambient brightness is high and an amount of light entering the optical sensor 320 is equal to or more than a light amount to be detected, a voltage of the node N2 increases due to generated power of the optical sensor 320. Then, the P-channel MOS transistor 403 is turned OFF, and the N-channel MOS transistor 404 is turned ON. A voltage of the output terminal 430 is discharged to around the voltage of the reference power supply terminal GND with an ON-state current of the N-channel MOS transistor 404. In this way, when ambient brightness is high, Low is output to the output terminal 430. Further, the MOS transistors interrupt paths in which a current flows, and hence little consumption current is consumed.

When ambient brightness is low and the amount of light entering the optical sensor 320 is less than the light amount to be detected, the generated power of the optical sensor 320 is so small that the voltage of the node N2 may decrease due to the constant current discharge made by the constant current circuit 401. Then, the N-channel MOS transistor 404 is turned OFF, and the P-channel MOS transistor 403 is turned ON. The P-channel MOS transistor 403 operates as a source follower, decreases a voltage of the node N1, and turns ON the depletion type N-channel MOS transistor 402. The voltage of the output terminal 430 increases to around the voltage of the positive power supply terminal VDD with an ON-state current of the depletion type N-channel MOS transistor 402, which is supplied via the P-channel MOS transistor 403. In this way, when ambient brightness is low, High is output to the output terminal 430. Further, the MOS transistors interrupt the paths in which a current flows, and hence little consumption current is consumed.

As described above, the light detection means 204 included in the mouse device 101 according to the second embodiment of the present invention outputs Low to the output terminal 430 when ambient brightness is high, and outputs High to the output terminal 430 when ambient brightness is low. Further, regardless of ambient brightness, a path in which a current flows is interrupted all the time, and hence little consumption current is consumed. Therefore, power consumption may be reduced much more compared with the conventional mouse devices.

Note that, although not illustrated, it is possible to use general light detection means to realize the functions and features of the mouse device according to the present invention, except for current consumption, to thereby reduce power consumption compared with the conventional mouse devices. Further, the same effect can also be obtained by reversing polarities of all the transistors of FIG. 4.

Further, although not illustrated, what input to the node N2 of FIG. 4 may be a result determined by amplifying the generated power of the first optical sensor 105 of FIG. 1 one or more times and subtracting the resultant generated power from the generated power of the second optical sensor 106.

Still further, although not illustrated, the configuration may be realized by using only the first optical sensor 105 so that the mouse device may perform the low power consumption operation with only the detection of the mouse device as being touched with a hand. Alternatively, the configuration may be realized by using only the second optical sensor 106 so that the mouse device may perform the low power consumption operation with only the detection of ambient brightness.

What is claimed is:

1. A mouse device, which is provided with a plurality of operation modes,
   the plurality of operation modes including:
      a normal operation of converting a movement amount into an electrical signal and outputting the electrical signal; and
      a low consumption operation in which power consumption is smaller than power consumption in the normal operation,
   the mouse device comprising light detection means, the light detection means comprising:
      a p-n junction element for charging a second node in accordance with an amount of incident light;
      a second constant current circuit for discharging the second node;
      a depletion type N-channel MOS transistor for discharging a first node with an ON-state current of the depletion type N-channel MOS transistor, the depletion type N-channel MOS transistor including:
         a gate to which a voltage of a reference power supply terminal is input; and
         a source to which a voltage of the second node is input;
      a first P-channel MOS transistor for charging an output terminal with an ON-state current of the first P-channel MOS transistor through a third constant current circuit, the first P-channel MOS transistor including a gate to which a voltage of the first node is input;
      an N-channel MOS transistor for discharging the output terminal with an ON-state current of the N-channel MOS transistor, the N-channel MOS transistor including a gate to which the voltage of the second node is input; and
      a second P-channel MOS transistor for charging the first node with an ON-state current of the second P-channel MOS transistor through a first constant current circuit, the second P-channel MOS transistor including a gate to which a voltage of the output terminal is input,
   the mouse device switching the plurality of operation modes based on an output of the light detection means.

2. A mouse device according to claim 1, wherein the light detection means is installed in a region where a hand blocks light when the hand handles the mouse device, and detects the mouse device as being handled.

3. A mouse device according to claim 1, wherein the light detection means is installed in a region where a hand does not block light when the hand handles the mouse device, and detects ambient brightness.

4. A mouse device according to claim 1, wherein the light detection means comprises:
   first light detection means which is installed in a region where a hand blocks light when the hand handles the mouse device, for detecting the mouse device as being handled; and
   second light detection means which is installed in a region where the hand does not block light when the hand handles the mouse device, for detecting ambient brightness.

5. A mouse device according to claim 1, further comprising a switch for allowing the mouse device to perform the normal operation all the time.

6. A mouse device provided with a plurality of operation modes including a normal operation mode of converting a movement amount into an electrical signal and outputting the electrical signal and a low consumption operation mode in which power consumption is smaller than power consumption in the normal operation, the mouse device comprising:
   a light detection means comprising:
      a p-n junction element for charging a second node in accordance with an amount of incident light;
      a second constant current circuit for discharging the second node;
      a depletion type N-channel MOS transistor for discharging a first node with an ON-state current of the depletion type N-channel MOS transistor, the depletion type N-channel MOS transistor including:
         a gate to which a voltage of a reference power supply terminal is input; and
         a source to which a voltage of the second node is input;
      a first P-channel MOS transistor for charging an output terminal with an ON-state current of the first P-channel MOS transistor through a third constant current circuit, the first P-channel MOS transistor including a gate to which a voltage of the first node is input;
      an N-channel MOS transistor for discharging the output terminal with an ON-state current of the N-channel MOS transistor, the N-channel MOS transistor including a gate to which the voltage of the second node is input; and
      a second P-channel MOS transistor for charging the first node with an ON-state current of the second P-channel MOS transistor through a first constant current circuit, the second P-channel MOS transistor including a gate to which a voltage of the output terminal is input; and
   a control means for switching the plurality of operation modes based on an output of the light detection means.

7. A mouse device according to claim 6, wherein the light detection means is installed in a region where a hand blocks light when the hand handles the mouse device, and detects the mouse device as being handled.

8. A mouse device according to claim 6, wherein the light detection means is installed in a region where a hand does not block light when the hand handles the mouse device, and detects ambient brightness.

9. A mouse device according to claim 6, further comprising a switch for allowing the mouse device to perform the normal operation all the time.

10. A mouse device provided with a plurality of operation modes including a normal operation mode of converting a movement amount into an electrical signal and outputting the electrical signal and a low consumption operation mode in which power consumption is smaller than power consumption in the normal operation, the mouse device comprising:
- a light detection means comprising:
    - first and second circuit nodes;
    - a p-n junction element for charging the second node in accordance with an amount of incident light;
    - a second constant current circuit for discharging the second node;
    - a depletion type N-channel MOS transistor connected between the second node and the first node,
    - a first P-channel MOS transistor for charging an output terminal with an ON-state current of the first P-channel MOS transistor through a third constant current circuit, the first P-channel MOS transistor comprising a gate connected to the first node;
    - an N-channel MOS transistor for discharging the output terminal with an ON-state current of the N-channel MOS transistor, the N-channel MOS transistor comprising a gate connected with the second node; and
    - a second P-channel MOS transistor for charging the first node with an ON-state current of the second P-channel MOS transistor through a first constant current circuit, the second P-channel MOS transistor comprising a gate connected to the output terminal; and
- a control means for switching the plurality of operation modes based on an output of the light detection means.

11. A mouse device according to claim 10, wherein the light detection means is installed in a region where a hand blocks light when the hand handles the mouse device, and detects the mouse device as being handled.

12. A mouse device according to claim 10, wherein the light detection means is installed in a region where a hand does not block light when the hand handles the mouse device, and detects ambient brightness.

13. A mouse device according to claim 10, further comprising a switch for allowing the mouse device to perform the normal operation all the time.

* * * * *